(12) United States Patent
Eyole

(10) Patent No.: US 12,182,575 B2
(45) Date of Patent: Dec. 31, 2024

(54) PERFORMANCE MONITORING INFORMATION INFORMED REGISTER RENAMING

(71) Applicant: Arm Limited, Cambridge (GB)

(72) Inventor: Mbou Eyole, Soham (GB)

(73) Assignee: Arm Limited, Cambridge (GB)

(*) Notice: Subject to any disclaimer, the term of this patent is extended or adjusted under 35 U.S.C. 154(b) by 100 days.

(21) Appl. No.: 18/079,308

(22) Filed: Dec. 12, 2022

(65) Prior Publication Data
US 2024/0192959 A1   Jun. 13, 2024

(51) Int. Cl.
*G06F 9/38* (2018.01)
(52) U.S. Cl.
CPC ................... *G06F 9/384* (2013.01)
(58) Field of Classification Search
CPC ....................................... G06F 9/384
See application file for complete search history.

(56) References Cited

U.S. PATENT DOCUMENTS

| | | | | |
|---|---|---|---|---|
| 6,279,102 B1 * | 8/2001 | Morrison | ............ | G06F 9/3836 712/216 |
| 6,336,160 B1 * | 1/2002 | Eickemeyer | ............ | G06F 9/384 712/217 |
| 6,389,529 B1 * | 5/2002 | Arimilli | ................ | G06F 9/3824 712/E9.046 |
| 2005/0138334 A1 * | 6/2005 | Sodani | ................ | G06F 9/30098 712/E9.023 |

(Continued)

OTHER PUBLICATIONS

Safi, Elham, Andreas Moshovos, and Andreas Veneris. "Two-stage, pipelined register renaming." IEEE transactions on very large scale integration (VLSI) systems, vol. 19, No. 10, Oct. 2011, pp. 1926-1931; 2010 (Year: 2010).*

*Primary Examiner* — Keith E Vicary
(74) *Attorney, Agent, or Firm* — NIXON & VANDERHYE P.C.

(57) ABSTRACT

A data processing apparatus comprises: a physical register array, prediction circuitry, register rename circuitry, and hardware execution circuitry. The physical register array comprises a plurality of sectors having one or more different access properties, each of the plurality of sectors having one or more different access properties compared to other sectors of the plurality of sectors, each sector of the plurality of sectors comprising at least one physical register. The prediction circuitry to predict, for a given instruction, a sector identifier identifying one of the sectors of the physical register array to be used for a destination register of the given instruction. The prediction circuitry is configured to select the sector identifier in dependence on prediction information learnt from performance monitoring information indicative of performance achieved for a sequence of instructions when using different sector identifiers for the given instruction. The register rename circuitry to map a destination architectural register identifier specified by the given instruction to a destination physical register in the sector identified by the sector identifier predicted by the prediction circuitry. The execution circuitry to execute the given instruction and generate a result to be written to the destination physical register mapped to the destination architectural register identifier by the register rename circuitry.

20 Claims, 5 Drawing Sheets

(56) References Cited

U.S. PATENT DOCUMENTS

Figures 1, 2:
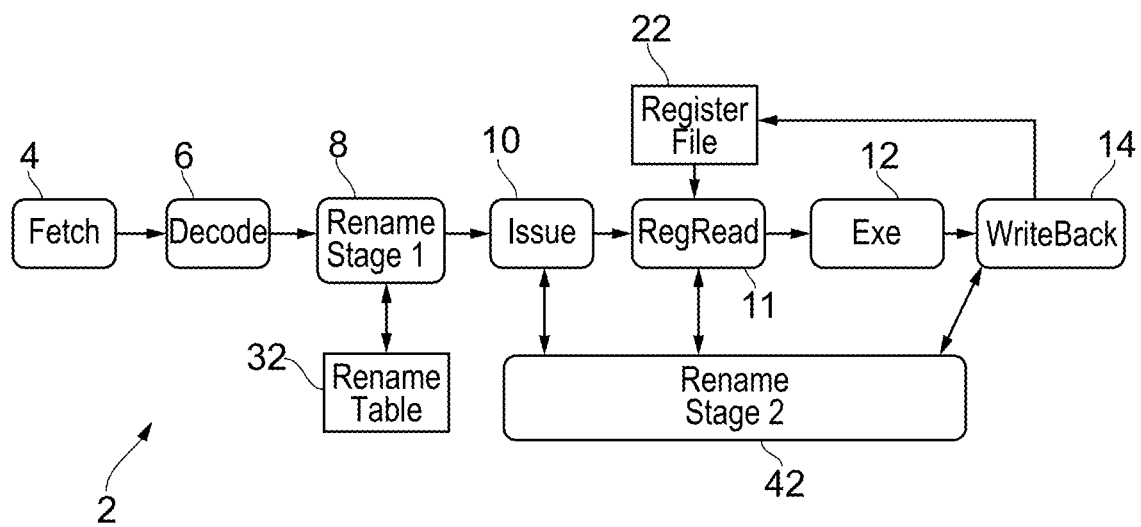

| | | | |
|---|---|---|---|
| 2008/0046692 A1* | 2/2008 | Michalak | G06F 9/3842 |
| | | | 712/E9.05 |
| 2008/0133893 A1* | 6/2008 | Glew | G06F 9/3856 |
| | | | 712/E9.016 |
| 2011/0283096 A1* | 11/2011 | Abernathy | G06F 9/30087 |
| | | | 712/E9.004 |
| 2012/0072700 A1* | 3/2012 | Abernathy | G06F 9/30138 |
| | | | 711/170 |
| 2013/0151891 A1* | 6/2013 | Piry | G06F 11/3058 |
| | | | 714/10 |
| 2014/0122840 A1* | 5/2014 | Abernathy | G06F 9/30101 |
| | | | 712/225 |
| 2014/0122841 A1* | 5/2014 | Abernathy | G06F 9/3012 |
| | | | 712/225 |
| 2014/0122842 A1* | 5/2014 | Abernathy | G06F 9/34 |
| | | | 712/225 |
| 2015/0134935 A1* | 5/2015 | Blasco | G06F 9/384 |
| | | | 712/220 |
| 2015/0154022 A1* | 6/2015 | Khot | G06F 9/30123 |
| | | | 712/217 |

\* cited by examiner

| Arch Reg | Phys Reg Tag |
|---|---|
| A0 | PT35 |
| A1 | PT45 |
| A2 | PT42 |
| : | : |

| PC | Sector ID | Confidence |
|---|---|---|
| | | |

FIG. 5A

| Arch reg | PC (subset) | Sector ID | Confidence |
|---|---|---|---|
| | | | |

FIG. 5B

| PC | Sector ID | Delay | Confidence |
|---|---|---|---|
| | | | |

FIG. 5C

| Arch reg | PC (subset) | Sector ID | Delay | Confidence |
|---|---|---|---|---|
| | | | | |

FIG. 5D

PERFORMANCE MONITORING INFORMATION INFORMED REGISTER RENAMING

The present technique relates to the field of data processing. More particularly, it relates to register renaming.

A data processing apparatus may support register renaming in which architectural register identifiers specified by instructions are associated with physical register identifiers for physical registers to be accessed in response to the instructions. Register renaming can remove dependencies between instructions that may arise from the reuse of architectural register identifiers in an instruction sequence to thereby improve parallelism. For example, so called false write-after-write (WAW) and write-after-read (WAR) dependencies can be removed using register renaming. The present techniques provide improved register renaming.

At least some examples provide a data processing apparatus comprising:
- a physical register array comprising a plurality of sectors having one or more different access properties, each sector of the plurality of sectors comprising at least one physical register;
- prediction circuitry to predict, for a given instruction, a sector identifier identifying one of the sectors of the physical register array to be used for a destination register of the given instruction, wherein the prediction circuitry is configured to select the sector identifier in dependence on prediction information learnt from performance monitoring information indicative of performance achieved for a sequence of instructions when using different sector identifiers for the given instruction;
- register rename circuitry to map a destination architectural register identifier specified by the given instruction to a destination physical register in the sector identified by the sector identifier predicted by the prediction circuitry; and
- execution circuitry to execute the given instruction and generate a result to be written to the destination physical register mapped to the destination architectural register identifier by the register rename circuitry At least some examples provide a data processing apparatus comprising:
- a physical register array comprising a plurality of sectors having one or more different access properties, each sector of the plurality of sectors comprising at least one physical register;
- prediction circuitry to predict, for a given instruction, a sector identifier identifying one of the sectors of the physical register array to be used for a destination register of the given instruction and a delay indicator for controlling scheduling of one or more subsequent instructions after the given instruction, wherein the prediction circuitry is configured to predict the sector identifier and the delay indicator in dependence on prediction information learnt from performance monitoring information indicative of performance achieved for a sequence of instructions when using different sector identifiers and different delay indicators for the given instruction;
- register rename circuitry to map a destination architectural register identifier specified by the given instruction to a destination physical register in the sector identified by the sector identifier predicted by the prediction circuitry;
- execution circuitry to execute the given instruction and generate a result to be written to the destination physical register mapped to the destination architectural register identifier by the register rename circuitry; and
- scheduling circuitry to schedule timing of execution of one or more of the subsequent instructions based on the delay indicator predicted by the prediction circuitry.

At least some examples may provide a data processing method comprising:
- predicting, for a given instruction, a sector identifier identifying a sector of a physical register array to be used for a destination register of the given instruction, the physical register array comprising a plurality of sectors having one or more different access properties, each sector of the plurality of sectors comprising at least one physical register, wherein predicting the sector identifier for the given instructions comprises selecting the sector identifier in dependence on prediction information learnt from performance monitoring information indicative of performance achieved for a sequence of instructions when using different sector identifiers for the given instruction;
- mapping a destination architectural register identifier specified by the given instruction to a destination physical register in the sector identified by the sector identifier predicted for the given instruction; and
- executing the given instruction and generating a result to be written to the destination physical register mapped to the destination architectural register identifier.

Figure 3:
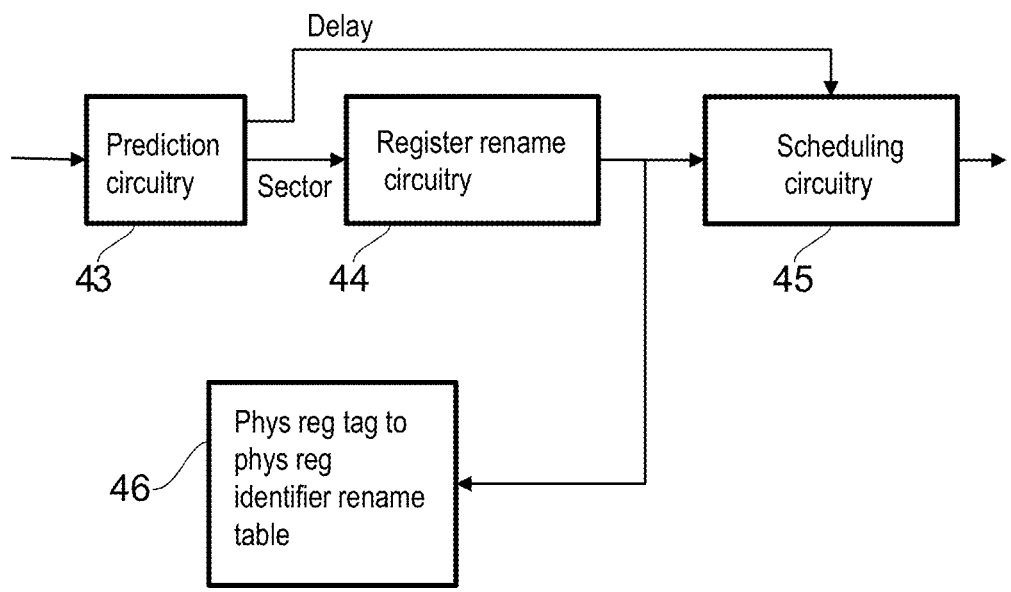
Figure 4:
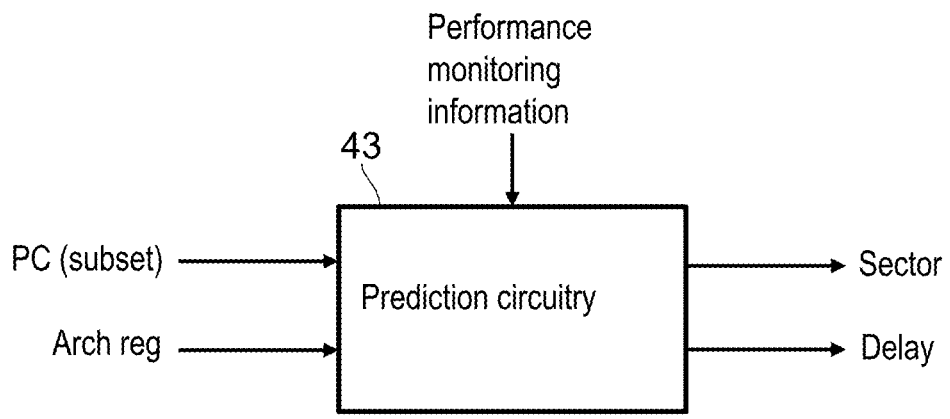
Figure 6:
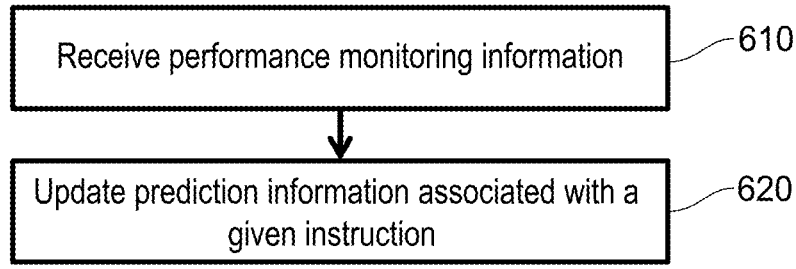
Figure 7:
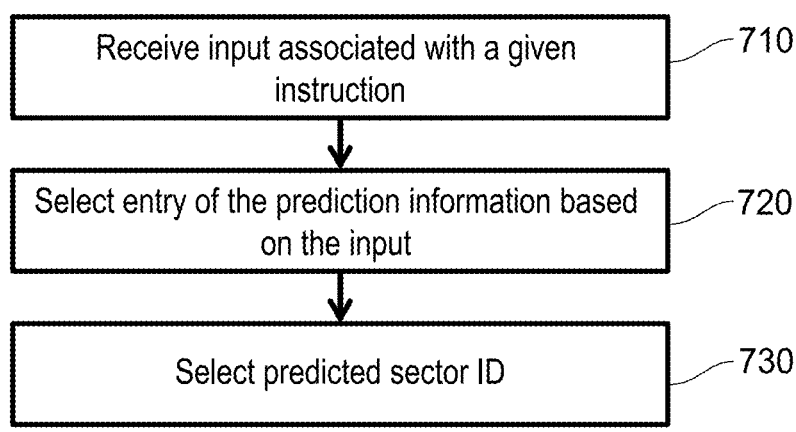
Figure 8:
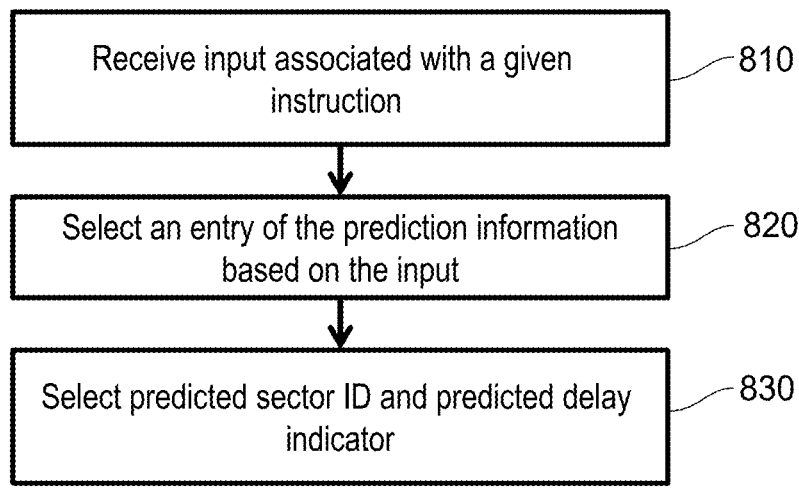
Figure 9:
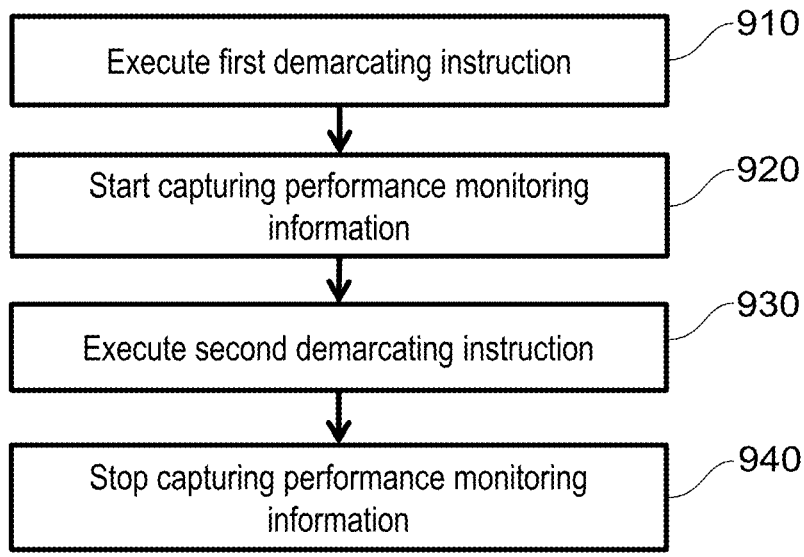
Figure 10:
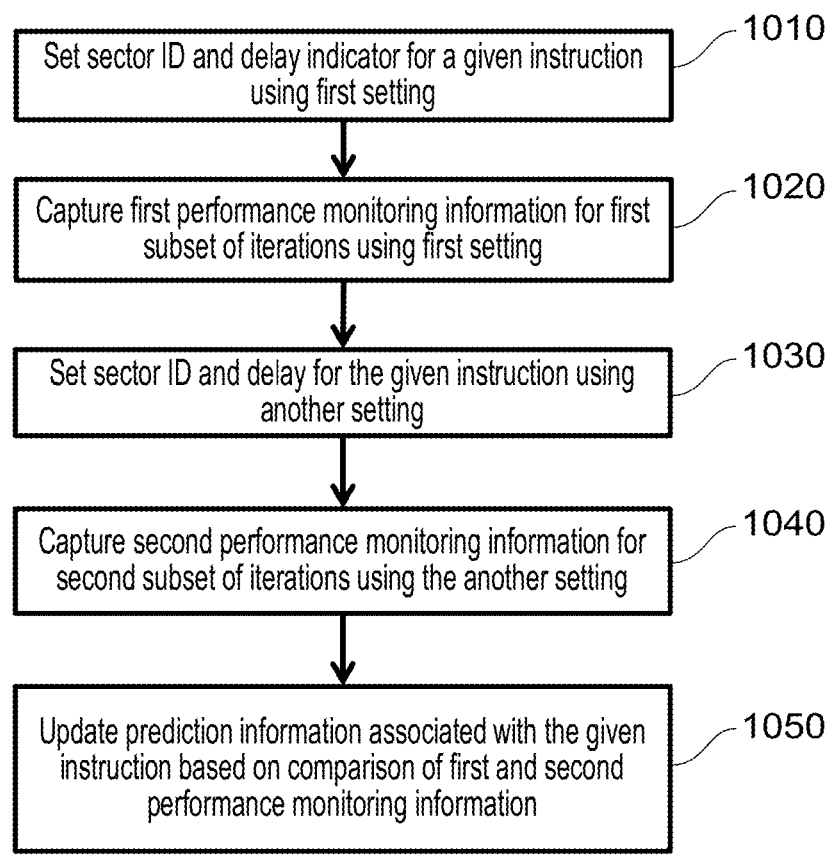

Further aspects, features and advantages of the present technique will be apparent from the following description of examples, which is to be read in conjunction with the accompanying drawings, in which:

FIG. 1 schematically illustrates a portion of a portion of a data processing apparatus for performing register renaming;

FIG. 2 schematically illustrates an example of a rename table for associating architectural register identifiers with physical register identifiers;

FIG. 3 schematically illustrates an example of prediction circuitry and register rename circuitry;

FIG. 4 schematically illustrates the prediction circuitry for predicting a sector identifier and delay indicator;

FIGS. 5A-5D schematically illustrate examples of prediction information;

FIG. 6 schematically illustrates a method of updating prediction information based on performance monitoring information;

FIG. 7 schematically illustrates a method of using prediction information to predict a sector identifier for a destination architectural register identifier specified by an instruction;

FIG. 8 schematically illustrates a method of using prediction information to predict both a sector identifier and a delay indicator for a destination architectural register identifier specified by an instruction;

FIG. 9 schematically illustrates a method for capturing performance monitoring information; and FIG. 10 schematically illustrates a method for capturing performance monitoring information using different settings for different subsets of code iterations.

Some examples of the present technique will now be described below.

Even when performing register renaming, delays in execution of instruction sequences can occur. For example, in some programs instructions may become stalled in one or more issue queues while waiting for functional units to become available and/or for dependencies to be resolved and/or for result values to be forwarded. The techniques to be discussed below provide improvements both in terms of register utilisation and latency by providing more intelligent register renaming.

In accordance with one example implementation a data processing apparatus comprises:
- a physical register array comprising a plurality of sectors having one or more different access properties, each sector of the plurality of sectors comprising at least one physical register;
- prediction circuitry to predict, for a given instruction, a sector identifier identifying one of the sectors of the physical register array to be used for a destination register of the given instruction, wherein the prediction circuitry is configured to select the sector identifier in dependence on prediction information learnt from performance monitoring information indicative of performance achieved for a sequence of instructions when using different sector identifiers for the given instruction; and
- register rename circuitry to map a destination architectural register identifier specified by the given instruction to a destination physical register in the sector identified by the sector identifier predicted by the prediction circuitry; and
- execution circuitry to execute the given instruction and generate a result to be written to the destination physical register mapped to the destination architectural register identifier by the register rename circuitry.

The physical register array comprises physical registers for storing data values for use by the execution circuitry. The execution circuitry is configured to execute instructions to perform data processing operations specified by those instructions to access data values stored by the physical registers and generate result values that are to be written to physical registers in the physical register array.

In the techniques of the present disclosure, the physical register array comprises a plurality of sectors having one or more different access properties. The sectors may have different numbers of physical registers or some (or each of the) sectors may have a same number of physical registers. Each sector can be identified by a sector identifier. Similarly, each physical register of the physical register array can be identified by a physical register identifier.

The physical register array can therefore be considered as being segmented into different sectors each identifiable by a sector identifier and the different sectors providing different access properties and thus different access performance. For example, some sectors may allow one or more of faster access than other sectors and/or servicing of a greater number of parallel accesses than other sectors. In particular, sectors may differ due to having one or more different access properties such as a different number of read ports and/or different access latency and/or due to the sectors having different storage microarchitecture. More generally, as a consequence of having one or more different access properties, data values stored in different sectors can be accessed with different access performance.

By using performance monitoring information indicative of performance achieved for a sequence of instructions when writing a result value generated for a given instruction to physical registers in different sectors having different access properties, prediction information can be learned for predicting a sector in the plurality of sectors that is predicted to provide improved performance when executing the sequence of instructions. The prediction circuitry therefore predicts a sector identifier indicative of a sector of the physical register array which is to be used for storing a result value for a given instruction. The register rename circuitry uses the sector identifier predicted by the prediction circuitry to map the destination architectural register identifier specified by the given instruction to a physical register identifier of a destination physical register that is included in the sector that is identified by the sector identifier.

Therefore, the execution circuitry is configured to execute the given instruction in dependence on the physical register identifier provided by the rename circuitry so that the execution circuitry generates the result value to be written to the destination physical register that is included in the sector that is identified by the sector identifier. The result value is thus written to the destination physical register which is predicted to provide improved performance for the execution of the sequence of instructions including the given instruction.

Various factors can influence whether a choice of sector used for storing the result value has an effect on performance and/or an extent to which performance changes depending on the choice of sector. Evaluating such factors for an instruction sequence can be complex, with the influence of certain factors potentially being unknown or counterintuitive. For example, use of a policy such as counting a number of consumers of respective result values and storing result values in different sectors accordingly, can fail to account for other factors at play or that changes with respect to individual instructions may have unforeseen consequences.

Therefore, the techniques of the present disclosure provide performance monitoring information indicative of performance achieved for a sequence of instructions when using different sector identifiers (and thus storing the result value for the given instruction in different sectors having different access properties) for the given instruction. Therefore, through measured performance for the sequence of instructions under different conditions, differences in performance due to differences in sector selection can be identified and prediction information can be learned. The prediction information allows prediction of a sector identifier corresponding to a sector that is predicted to provide improved performance. The predicted sector identifier can thus be used by the rename circuitry when performing the renaming with respect to the destination architectural register identifier so that the destination architectural register identifier is mapped to a destination physical register in the sector.

In some examples, the prediction circuitry is configured to receive an input comprising at least a portion of a value of a program counter associated with a given instruction and to predict a sector identifier for the given instruction in dependence on the input and the prediction information. As explained previously, a sector identifier is predicted for the given instruction using the prediction information that has been learned for the given instruction. The prediction information is capable of being learned for a number of different instructions in a given instruction sequence using the same principles of varying the sectors used for storing the result values for different instructions. Therefore, by using the prediction information, a respective sector identifier can be predicted for a first instruction in an instruction sequence and another respective sector identifier can be predicted for a second instruction in the instruction sequence, so that result values for the different instructions will be written to different sectors that have been learned as providing favourable performance for the instruction sequence. There, in some examples the prediction circuitry can be configured to determine an identity of an instruction so that the prediction information associated with that instruction can be used for predicting the sector identifier. In some cases, a full value of a program counter associated with an instruction can be input to the prediction circuitry for identifying the instruction. The full value of the program counter thus uniquely identifies the instruction. The prediction circuitry can use the value of the program counter and select the sector identifier that has previously been learned for that instruction.

However, use of a full length of a value of a program counter can be expensive in hardware (e.g. due to the use of wider comparators for comparing a program counter of a current instruction against stored tags). Therefore, in some examples the prediction circuitry is configured to receive an input comprising a portion (subset) of a value of a program counter associated with an instruction. The prediction circuitry may thus be operable to identify a correspondence between the input and an instruction for which the prediction information has been learned in dependence upon a subset of the value of a program counter. This can allow for a reduction in the number of bits provided as an input to the prediction circuitry compared to the case in which the full value of the program counter is input. For example, in a 64-bit or 32-bit architecture, program counter values of 64 bits and 32 bits, respectively, can be input to the prediction circuitry, however, a subset of the program counter values may instead be used to achieve energy saving improvements.

In some examples, the prediction circuitry is configured to receive an input comprising a portion of a value of a program counter associated with a given instruction and a destination architectural register identifier specified by the given instruction, and to predict the sector identifier for the given instruction in dependence on the input and the prediction information. The prediction circuitry may thus be operable to identify a correspondence between the input and an instruction for which the prediction information has been learned in dependence upon a subset of the value of a program counter and a destination architectural register identifier specified by the instruction. This may be particularly beneficial in that a relatively small number of bits for the program counter associated with the instruction may be used in combination with the destination architectural register identifier. Therefore, a number of bits provided as an input to the prediction circuitry can be reduced compared to the case of inputting a full value of a program counter associated with an instruction. In particular, by inputting a destination architectural register identifier specified by an instruction, this can potentially reduce a number of aliases between instructions having a same value for all bits of the program counter subset.

The inventor has found that the use of an input comprising a portion of a value of a program counter associated with a given instruction and a destination architectural register identifier can improve prediction of sector compared to using an input comprising a same number of bits but comprising the program counter alone. This is because, whilst instructions which are close to each other in an original program order typically share many of the same program counter bits, such instructions also may have different architectural register identifiers. The destination architectural register identifiers can be expected to be different for at least some of the instructions close to each other in an original program order, for reducing a likelihood of false WAW and WAR hazards. Therefore, instructions (and in particular instructions which are close to each other in an original program order) can be distinguished more efficiently using the subset of the program counter value and the destination architectural register identifier.

In some examples, the performance monitoring information comprises timing information indicative of measured times to process the sequence of instructions using different sector identifiers for the given instruction, and wherein the prediction circuitry is configured to predict, as the sector identifier for the given instruction, a sector identifier learned for the given instruction in dependence on the measured times. As explained previously, the performance monitoring information can be obtained with respect to a sequence of instructions using two or more different sector identifiers for a given instruction. For example, a first performance measurement may be obtained for the sequence of instruction when using a given sector identifier for the given instruction and a second performance measurement may be obtained using another sector identifier for the given instruction. Further performance measurements may be obtained in this way for the given instruction and/or for other instructions in the sequence. The performance measurements may comprise timing information representing an amount of time required for the data processing apparatus to process the sequence of instructions and/or an amount of time required to process a subset of the sequence of instructions. In some cases, the sequence of instructions may correspond to a block of code that is to be repeated a number of times. The sequence of instructions may thus be executed a number of times and an amount of time required to process a given number of iterations of the sequence of instructions may be measured for the performance monitoring information.

More generally, differences in the measured times achieved using the different sector identifiers for the given instruction can be used to learn prediction information for predicting a sector identifier that is likely to achieve improved (e.g. optimised) performance for the execution of the sequence of instructions. For example, a first timing measurement may be observed when using a first sector to store the result value of a respective instruction, and a second timing measurement may instead be observed when using a second sector to store the result value of the respective instruction, in which the first timing measurement is different from the second timing measurement. It can thus be learned which of the sectors results in achieving the more desirable timing measurement and selection of the sector with the more desirable timing measurement can be learned as being beneficial to processing performance. More generally, timing measurements using the first and second sectors can at least indicate whether changing the sector for storing the result value for that respective instruction causes a change in the timing measurements and this can be used for learning, for the respective instruction, whether choice of sector is relevant to performance for the sequence of instruction.

For example, for a respective instruction for which no change in performance is observed for the instruction sequence including the respective instruction when changing the sector, the prediction information may be learned so that a sector with relatively low (relative to other sectors in the register array) access properties can be used for storing the result value for the instruction since there is no performance benefit when using sectors with relatively higher access properties. Conversely, for a respective instruction for which a change in performance is observed when changing the sector, the prediction information may be learned so that a sector with relatively high access properties can be used for storing the result value. In a similar manner, through the performance monitoring information, it may be learned that, for a respective instruction, use of a sector with an access property above a threshold access property (e.g. above a threshold access latency) does not yield (or yields negligible) further improvements in performance and, in order to improve use of register resources, a sector corresponding to the threshold access property can be learned. This can potentially free up sectors having higher access properties for use by other instructions that achieve improvements in performance when using such sectors.

In some examples, the prediction circuitry is configured to learn, as the sector identifier learned for the given instruction in dependence on the measured times, a sector identifier that corresponds to a shortest time to process the given sequence of instructions. A number of respective timing measurements can be obtained for a sequence of instructions using different sector identifiers for a respective instruction, and through such timing measurements a sector identifier associated with a shortest processing time for the sequence of instructions can be learned. For example, different sector identifiers may be used and a respective sector identifier for which the shortest measured time to process the given sequence of instructions is observed may be learned as the sector identifier. Hence, in some examples timing measurements may be obtained using each possible sector of the physical register array for storing a result value for a given instruction, and the sector corresponding to the shortest measured time can be learned. Alternatively, in some cases a number of respective timing measurements may be obtained and a sector identifier corresponding to a shortest time to process the given sequence of instructions may be identified based on interpolation of the timing measurements and their associated sector identifiers and the access properties associated therewith.

The above techniques have generally been described with respect to a respective instruction in a sequence of instructions so as to predict the sector identifier for the respective instruction and write the result value to a destination physical register in a sector that is predicted to achieve enhanced performance. However, it will be appreciated that the above techniques can similarly be performed for other instructions included in the sequence to achieve performance benefits by storing result values for the other instructions in sectors that are predicted to achieve enhanced performance.

Therefore, in some examples the performance monitoring information comprises timing information indicative of measured times to process the sequence of instructions using different sector identifiers for a given instruction and, for one or more other instructions associated with the sequence of instructions, the performance monitoring information comprises timing information indicative of measured times to process the sequence of instructions using different sector identifiers for each of the one or more other instructions, and wherein the prediction circuitry is configured to predict, as a respective sector identifier for each of the one or more other instructions, a respective sector identifier learned for each of the one or more other instructions in dependence on the measured times. This enables instruction-specific predictions to be made for which sector to use for multiple instructions in the sequence, further improving the performance improvement achievable for the sequence as a whole compared to an implementation which only predicts one instruction in the sequence.

In some examples, a change of the sector identifier for a single instruction may be made between successive timing measurements. This can allow the effect on the performance that is caused by changing the sector identifier for the single instruction to be more easily distinguished. Alternatively, a change of the sector identifier for a plurality of instructions may be made between successive timing measurements. It may be possible to trial different combinations of sector identifiers for a plurality of instructions and use such performance monitoring information to learn, for each of the plurality of instructions, a corresponding sector identifier. This may assist in reducing an amount of time required for learning the prediction information.

In some examples, the performance monitoring information comprises timing information indicative of measured times to process a sequence of instructions using different sector identifiers for a given instruction and different delay indicators for controlling scheduling of one or more subsequent instructions after the given instruction, and wherein the prediction circuitry is configured to predict, as a sector identifier and a delay indicator for the given instruction, a sector identifier and a delay indicator learned for the given instruction in dependence on the measured times. In addition to varying a sector identifier for a given instruction and obtaining a plurality of timing measurements for processing the instruction sequence using the different sector identifiers, varying of a delay indicator for the given instruction and obtaining a plurality of timing measurements for processing the instruction sequence using the different delay indicators may also be performed. Therefore, prediction information can be learned from the performance monitoring information indicative of performance achieved for a sequence of instructions when using different sector identifiers and different delay indicators for the given instruction.

The inventor has observed that, in some cases, whilst source operands specified by some instructions may be available in a register array, functional units in the execution circuitry for performing the specified data processing operations may not be available and instructions can become stalled. Therefore, in some cases delaying one or more instructions using the delay indicator can provide performance benefits, as delaying an instruction which is unlikely to give a performance benefit if completed sooner (e.g. as its dependent instructions may get stalled anyway) may free up resources that can be better used for another instruction that is not as likely to cause a stall. In particular, by providing the delay indicator, controlled scheduling of one or more subsequent instructions that depend on the given instruction can be performed and an amount of delay for achieving enhanced performance can be learned through the performance monitoring information.

Various possibilities are provided for specifying the delay indicator for the given instruction so as to control scheduling of one or more subsequent instructions that depend on the given instruction. The delay indicator may be specified in units of time or as a number of clock cycles. The delay indicator can be specified as a result availability delay for a result of the given instruction such that the result value for the given instruction is suppressed from being available as a source operand to one or more subsequent instructions for a specified amount of time. The result value may be written to the destination physical register and associated with delay information for suppressing availability to other instructions. Alternatively or in addition, writing of the result value to the destination physical register may instead be delayed according to the delay indicator (for example by being delayed in one more busses). Alternatively or in addition, the delay indicator may be indicative of a subsequent instruction execution delay by specifying one or more instructions that are to be delayed and specifying the amount of delay. Therefore, in some examples the delay indicator is indicative of at least one of a result availability delay for a result of the given instruction and a subsequent instruction execution delay.

In response to receiving an input specifying the given instruction (e.g. specifying an a subset of the program counter value and the destination architectural register identifier, as discussed previously), the prediction circuitry is thus operable to predict a sector identifier and a delay indicator for the given instruction using the prediction information learned for the given instruction in dependence on the performance monitoring information. For the performance information, measured times to process the sequence of instructions may be obtained by varying at least one of the sector identifier and the delay indicator between successive measurements. Therefore, in a similar manner to that discussed previously with respect to just the sector identifier, both the sector identifier and the delay indicator can be varied and the prediction information learned so as to select a sector identifier and a delay indicator that achieves enhanced performance for the sequence of instructions using a learned sector and a learned instruction execution scheduling.

In some examples, the prediction circuitry is configured to learn, as the sector identifier and the delay indicator learned for the given instruction in dependence on the measured times, a combination of a sector identifier and a delay indicator that corresponds to a shortest time to process the given sequence of instructions. Measured times to process the sequence of instructions may be obtained by varying at least one of the sector identifier and the delay indicator between successive measurements. In some cases, a change of one of the sector identifier and the delay indicator may be made between successive measurements to allow the effect of each of the sector identifier and the delay indicator to be separately determined. However, in some cases measured times to process the sequence of instructions may be obtained by varying both the sector identifier and the delay indicator between successive measurements. This may assist in reducing an amount of time required for learning the prediction information and/or revealing any performance enhancements that may be obtained for specific sector-delay combinations.

More generally, a number of respective timing measurements can be obtained for a sequence of instructions using different sector identifiers and different delay indicators for a respective instruction, and through such timing measurements a sector identifier and delay indicator associated with a shortest time for processing the sequence of instructions can be learned.

As explained in more detail later, the prediction information may be learned by the prediction circuitry in advance as part of an offline learning process or may be learned as part of an online process. In relation to online learning, by providing performance monitoring information obtained when executing instructions using predictions provided by the prediction circuitry as feedback to the prediction circuitry, the prediction information can be learned by the prediction circuitry. Hence, in some examples, the prediction circuitry is operable to predict a sector identifier and delay indicator using the prediction information, the result value is written to a destination physical register in the sector identifier by the sector identifier, one or more subsequent instructions that depend on the result value are scheduled according to the delay indicator, and performance monitoring information for the processing of the instruction sequence under those conditions is provided to the prediction circuitry as feedback information for further learning for updating and improving the prediction information. For example, through such feedback, at least one of the sector identifier and the delay indicator (e.g. number of clock cycles being specified) being predicted for the given instruction can be updated in a way that improves performance. Reinforcement learning techniques may be used in such cases by applying a reward function that positively rewards actions resulting in performance improvements.

The above techniques have been described with respect to a respective instruction in a sequence of instructions so as to predict the sector identifier and the delay indicator for the respective instruction and write the result value to a destination physical register in a sector and control scheduling of one or more instructions that depend on the result value in a way that is predicted to achieve enhanced performance. However, it will be appreciated that the above techniques can similarly be performed for other instructions included in the sequence to control result value sector selection and instruction scheduling.

In some examples, the performance monitoring information comprises timing information indicative of measured times to process the sequence of instructions using different sector identifiers and different delay indicators for a given instruction and, for one or more other instructions associated with the sequence of instructions, the performance monitoring information comprises timing information indicative of measured times to process the sequence of instructions using different sector identifiers and different delay indicators for each of the one or more other instructions, and wherein the prediction circuitry is configured to predict, as a respective sector identifier and respective delay indicator identifier for each of the one or more other instructions, a respective sector identifier and a respective delay indicator learned for each of the one or more other instructions in dependence on the measured times.

In some examples, the data processing apparatus comprises scheduling circuitry to schedule timing of execution of one or more of the subsequent instructions after the given instruction based on the delay indicator predicted for the given instruction by the prediction circuitry. Scheduling circuitry can be provided for scheduling instructions in the sequence of instructions in accordance with the delay indicator. Hence, at least some of the instructions in the instruction sequence can be delayed. Instructions may thus be scheduled for execution by the execution circuitry in a different order to an original program order in which they were fetched. By varying the timing of execution of subsequent instructions based on delays predicted for an earlier instruction, this can help to improve instruction scheduling (e.g. by scheduling an instruction to be issued based on the predicted register sector properties expected for an earlier instruction with a particular sector prediction, so that instructions are less likely to be issued for execution sooner than they are expected to be able to be executed, freeing up resources for other instructions which might be better able to make progress).

In some examples, in response to execution of the sequence of instructions, the prediction circuitry is configured to obtain, for the performance monitoring information, a measurement of a time to process a given number of iterations of the sequence of instructions and to update the prediction information in dependence upon the time to process the given number of iterations.

As discussed previously, in some cases the sequence of instructions to be executed may correspond to a block of code that is to be repeated a number of times. For example, the sequence of instructions may correspond to a section of code included in a loop so that the section of code is repeated a specified number of times. The sequence of instructions may thus be executed a number of times and an amount of time required to process a given number of iterations of the sequence of instructions may be measured for the performance monitoring information. Therefore, performance when executing the given number of iterations of the sequence of instructions using different settings for the sector identifier and delay indicator can be monitored for capturing the performance monitoring information. The techniques discussed above can be particularly useful when applied to looping code as a sequence of instructions expected to be iterated a number of times can give more opportunity to vary the settings for the sector identifier and/or delay indicator to learn better predictions.

In some examples, the prediction circuitry is configured to obtain, for the performance monitoring information, at least a first measurement of a time to process a subset of the given number of iterations using a first sector identifier for the given instruction, and a second measurement of a time to process another subset of the given number of iterations using a second sector identifier for the given instruction, wherein the first and second sector identifiers identify different sectors of the physical register. The sequence of instructions may be executed a given number of times as part of an iterative code block. A subset of the total number of iterations can be executed using a first sector identifier for a given instruction and another subset of the total number of iterations can be executed using a second sector identifier for the given instruction. In particular, a first number of the total number of iterations may be executed using the first sector identifier and a remainder of the total number of iterations may be executed using the second sector identifier. Alternatively, there may be three or more subsets of the total number of iterations, for which each subset is processed using a different sector identifier for the given instruction. This may assist in reducing an amount of time required for learning the prediction information.

In some cases, the data processing apparatus may comprise measurement probes and other circuitry for monitoring performance of processing of instruction sequences. In some cases, performance monitoring information may be obtained through use of demarcating instructions (also referred to as marker instructions) provided for an instruction sequence for assisting in obtaining the performance monitoring information. Execution of such demarcating instructions can be used to determine timing information for execution of an instruction sequence. Insertion of such demarcating instructions can be performed by a programmer or compiler for example to provide reference points for obtaining timing measurements.

In some examples, in response to execution of demarcating instructions bounding the sequence of instructions, the prediction circuitry is configured to obtain the performance monitoring information indicative of performance achieved for the sequence of instructions occurring between the demarcating instructions. The demarcating instructions can be arranged for a code block so as to bound a sequence of instructions, and a period of time between execution of a first demarcating instruction, representing a start of a monitoring period, and execution of a second demarcating instruction, representing an end of the monitoring period, can be measured. By providing such demarcating instructions, it can be simpler to detect the portions of program code (such as loops) that are more likely to give enough iterations to be able to learn the sector/delay predictions, without requiring specialist monitoring hardware for detecting the loops.

In some examples, demarcating instructions can be provided to bound a sequence of instructions corresponding to an iterative code block to allow measurement of an amount of time required to process each iteration and/or an amount of time required to process a given number of iterations. Therefore, measurement of timing information for processing the given number of iterations or a subset of the given number of iterations can be achieved through detection of execution of the demarcating instructions and an elapsed time between the execution of the demarcating instructions.

As discussed above, the respective sectors of the physical register array each comprise one or more registers and the sectors differ from each other due to having one or more different access properties.

In some examples, each register in a first sector has a first access latency and each register in a second sector has a second access latency different from the first access latency. This may for example be due to different storage technology being used for the different sectors. For example, different hardware (e.g. flip-flops or static random access memory (SRAM)) may be provided for different sectors to enable trade-offs to be made between power, access latency, and area.

Alternatively or in addition, in some examples a first sector may have a higher read port count than a second sector. Therefore, the greater number of read ports for the first sector means allows for a greater number of parallel reads to the first sector and thus greater access performance. In particular, for result values with a high frequency of use and/or having a large number of consumers, storing the result value to a sector having a higher read port counts can be learned, through the performance monitoring information, resulting in improved throughput of the instruction sequence.

In some examples, the register rename circuitry is configured to map one or more architectural register identifiers specified by the given instruction to one or more physical register tags as a first stage of register renaming for the instruction, and to map the one or more physical register tags to one or more physical registers of the physical register array as a second stage of register renaming, the first stage being earlier in a processing pipeline than the second stage. A first register rename stage and a second register rename stage may be provided, with the second register rename stage being later in a processing pipeline than the first register rename stage. A register rename table for mapping architectural register identifiers to physical register tags may be accessible for the first register rename stage so as to associate architectural register identifiers specified by instructions with physical register tags. At a subsequent stage in the processing pipeline, the second register rename stage can be provided for mapping the physical register tags to physical register identifiers that identify physical registers in the physical register array.

In particular, for the first stage of register renaming, by using the register rename table, one or more source architectural register identifiers can be associated with physical register tags. In addition to this, for a destination architectural register identifier, the register rename table can be updated to include a physical register tag associated with the destination architectural register identifier. For the second stage or register renaming, another register rename table (also referred to as a tag to identifier rename table) for mapping physical register tags to physical register identifiers is used. In this way, a binding to the particular physical registers used by the instructions can be set later in processing pipeline, whilst still allowing mapping of architectural register identifiers to a larger set of physical register tags early in the processing pipeline to reduce a number of false WAW and WAR hazards. The deferral can allow for the prediction(s) by the prediction circuitry, which are used for mapping a physical register tag associated with a destination architectural register identifier to a destination physical register in a sector of the physical register array, to be made later in the processing pipeline and consider more information on detailed instruction scheduling/delays.

The above example refers to using a first stage of register renaming and a second stage of register renaming, in which mapping of architectural register identifiers to physical register tags and mapping of physical register tags to physical registers are performed at the first and second stages, respectively. In some examples, the number of register renaming stages may be greater than two. In such cases, a first stage of register renaming is provided to map architectural register identifiers to physical register tags, as discussed previously, and two or more later stages of register renaming can be provided so that the binding of a physical register tag to a physical register is performed over the two or more later stages of renaming. Hence more generally, in some examples, the register rename circuitry can be configured to map one or more architectural register identifiers specified by the given instruction to one or more physical register tags as a first stage of register renaming for the instruction, and to map the one or more physical register tags to one or more physical registers of the physical register array as one or more later stages of register renaming, the first stage being earlier in a processing pipeline than the one or more later stages. The use of two or more later stages of register renaming can potentially mitigate pipeline hazards and/or account for various timing considerations.

In some examples, the register rename circuitry is configured to map a source architectural register identifier specified by the given instruction to a source physical register tag based on a mapping table comprising entries mapping respective architectural register identifiers to respective physical register tags, each physical register tag capable of being mapped by the second stage of register renaming to any of a plurality of physical register identifiers. The physical register tags are not tied to any specific physical register in the physical register array. The physical register tags allow an association with the architectural register identifiers to be made at a stage in the processing pipeline that can remove potential false WAW and WAR hazards, whilst allowing a binding to a particular physical register identifier to be made later in the processing pipeline, and for which binding for destination architectural register identifiers can be made using the sector identifier predicted by the prediction circuitry.

In some examples, a data processing apparatus comprises:
a physical register array comprising a plurality of sectors having one or more different access properties, each sector of the plurality of sectors comprising at least one physical register;
prediction circuitry to predict, for a given instruction, a sector identifier identifying one of the sectors of the physical register array to be used for a destination register of the given instruction and a delay indicator for controlling scheduling of one or more subsequent instructions after the given instruction, wherein the prediction circuitry is configured to predict the sector identifier and the delay indicator in dependence on prediction information learnt from performance monitoring information indicative of performance achieved for a sequence of instructions when using different sector identifiers and different delay indicators for the given instruction;
register rename circuitry to map a destination architectural register identifier specified by the given instruction to a destination physical register in the sector identified by the sector identifier predicted by the prediction circuitry;
execution circuitry to execute the given instruction and generate a result to be written to the destination physical register mapped to the destination architectural register identifier by the register rename circuitry; and
scheduling circuitry to schedule timing of execution of one or more of the subsequent instructions based on the delay indicator predicted by the prediction circuitry.

FIG. 1 schematically illustrates an example of a portion of a processing pipeline in a data processing apparatus 2. The processing pipeline includes a number of stages including a fetch stage 4, a decode stage 6, a first rename stage 8, an issue stage 10, a register read stage 11, an execute stage 12, a write back stage 14 and a second rename stage 42. Instructions to be processed move from stage to stage, and one instruction may be pending at one stage of the pipeline while another instruction is pending at a different stage. It will be appreciated that this is just one example of a possible pipeline and other examples may have other stages or arrangements.

As shown in FIG. 1, there may be some overlap between the second rename stage 42 and other pipeline stages such as the issue stage 10, register read stage 11 and execute stage 12. In the examples to be discussed below, the first rename stage 8 may access the rename table 32 for mapping architectural register identifiers to physical register tags, and the second rename stage 42 may access another table referred to as a physical register tag to physical register identifier table (not shown in FIG. 1) for mapping physical register tags to physical register identifiers identifying physical registers in the physical register file 22.

The first rename stage 8 may be used for mapping architectural register identifiers specified by instructions to physical register tags through use of the rename table 32. The physical register tags do not identify specific physical registers in the physical register file 22. Rather, an association with a tag can be made at the first rename stage 8 to remove false WAW and WAR hazards, and the tag can later (at the second rename stage 42) be mapped to a physical register identifier identifying a physical register in the physical register file 22.

Whilst in the example of FIG. 1 the data processing apparatus 2 is shown as having the first rename stage 8 and the second rename stage 42, in other examples a single rename stage may be provided. In this case there is no need to use the tags as an intermediate mapping of the registers—the single stage can map direct from architectural registers to physical registers. However, use of tags and the two stage register renaming approach can enable the binding between instructions and physical registers to be made later in the pipeline while still enabling earlier stages of the pipeline to eliminate some false register dependencies due to the first rename stage being provided.

The fetch stage 4 fetches program instructions from an instruction cache or memory. The decode stage 6 decodes the fetched instructions to generate decoded instructions which are passed to the rest of the pipeline for processing. For some instructions, a single instruction fetched from memory may be decoded into a single decoded instruction passed down the pipeline. However, for other more complex instructions, a single fetched instruction may be decoded into multiple decoded instructions known as "micro-operations". For example, an instruction for triggering a series of operations to be performed (such as a load multiple instruction) may be decoded into individual micro-operations each corresponding to one of the operations. Therefore, the "instructions" as seen by the later stages 8, 10, 11, 12, 14 of the pipeline may be different from the instructions fetched from memory and the term "instruction" should be interpreted as encompassing a micro-operation.

The apparatus 2 has a physical register file 22 (also referred to as a physical register array) comprising a number of physical registers for storing data values. The physical register file 22 comprises physical registers for storing data values for use by the execution circuitry 12. Data values stored by the physical register array can be accessed and generated result values can be written to physical registers in the physical register array.

In the techniques of the present disclosure, the physical register file 22 comprises a plurality of sectors having one or more different access properties. Different sectors thus provide different access properties and thus different access performance. For example, some sectors may allow one or more of faster access than other sectors and/or servicing of a greater number of parallel accesses than other sectors. In particular, sectors may differ due to having one or more different access properties such as a different number of read ports and/or different access latency and/or due to the sectors having different storage microarchitecture. More generally, as a consequence of having one or more different access properties, data values stored in different sectors can be accessed with different access performance.

The sectors may have different numbers of physical registers or some (or each of the) sectors may have a same number of physical registers. Each sector can be identified by a sector identifier. Similarly, each physical register of the physical register array can be identified by a physical register identifier.

The instruction set architecture (ISA) may support a certain number of architectural registers which are visible to a programmer. For example, a 4- or 5-bit register field in the instruction encoding may specify one of 16 or 32 different architectural register specifiers. However, a greater number of physical registers may be provided in the physical register file 22 than can be specified by the instruction set architecture. Therefore, register renaming can be performed at the first rename stage 8 using physical register tags to allow hazards between instructions specifying the same architectural register identifier to be resolved and permit out of order or parallel processing of instructions.

The renamed instructions for which physical register tags are specified for are passed to the issue queue 10 where they are queued while awaiting execution. Instructions remain in the issue queue until their operands are available, at which point the instruction is issued to the execute stage 12 for execution. Instructions may be issued for execution in a different order to the original program order in which they were fetched by the fetch stage 4. For example, while one instruction is stalled because its operands are not yet available, a later instruction whose operands are available may be issued first.

The execute stage 12 may include various processing units (e.g. functional units) for executing processing operations in response to instructions. For example, the processing units may include an arithmetic/logic unit (ALU) for performing arithmetic or logical operations, a load/store unit to perform load operations for loading a data value from memory and placing it in a physical register or store operations for storing to memory a data value currently stored in a physical register, a vector processing unit for performing vector operations on data values comprising multiple data elements, floating-point circuitry for performing operations on floating-point values, or any other type of processing circuitry. In some cases the execute stage 12 may include a number of parallel execute pipelines for processing different kinds of instructions.

When execution of the instruction is complete in the execute stage 12, the instruction is passed to the write back stage 14, which writes a result value of the instruction to a physical register in the physical register file 22. The result value can thus be stored and potentially used as a source operand by other subsequent instructions.

In the example shown in FIG. 1, the reading of the physical registers may take place at the register read stage 11. However, other embodiments may read the physical registers while the instruction is pending in an issue queue at the issue stage 10 or at the execute stage 12 instead.

For a given instruction, both the source and destination architectural register identifiers specified by the given instruction may be renamed (that is, mapped to physical register tags) at the first rename stage 8 using the rename table 32. At the second rename stage 42 later in the processing pipeline, the physical register tag to physical register identifier table can be accessed. Physical register identifiers can be looked-up for the physical register tags associated with the source architectural register identifiers. In addition, a mapping for a physical register tag associated with a destination architectural register identifier can be determined using a prediction from prediction circuitry, and the physical register tag to physical register identifier table updated to include a destination physical register mapped to the physical register tag associated with the destination architectural register identifier.

The second rename stage 42 can comprise the prediction circuitry for predicting sector identifiers for instructions. The second rename stage 42 can further comprise the register rename circuitry for mapping architectural register identifiers to physical registers in the physical register file 22, in which mapping to destination physical registers in the register file 22 is performed in dependence upon sector identifiers predicted by the prediction circuitry.

The second rename stage 42 thus maps a destination architectural register identifier specified by an instruction to a destination physical register in a sector of the physical register file 22, in which the sector corresponds to the sector identifier predicted by the prediction circuitry. The data processing operation specified by that instruction is performed at the execute stage 12 and the result value written back to the destination physical register at the write back stage 14. In response to the destination architectural register identifier being mapped to a destination physical register at the second rename stage 42, the physical register tag to physical register identifier rename table can be updated accordingly to store the physical register identifier for the destination physical register in the rename table to thereby associate the destination architectural register identifier with the destination physical register. Hence, other subsequent instructions specifying source operands for using the result value can be renamed at the second rename stage 42 to specify the destination physical register.

FIG. 2 schematically illustrates an example of the rename table 32. The rename table comprises an architectural register identifier field (shown on the left) including entries for each of the architectural register identifiers that can be specified by the instructions. The rename table comprises a physical register tag field (shown on the right) including entries for storing physical register tags. Therefore, using the rename table, architectural register identifiers are associated with physical register tags.

In response to an instruction specifying a source architectural register identifier, the first rename stage 8 is operable to lookup, in the physical register tag field (shown on the right side in FIG. 2), an entry associated with the source architectural register identifier for mapping the source architectural register identifier to a physical register identifier. However, in the case of a destination architectural register identifier, then the first rename stage 8 is operable to select a new physical register tag and update the physical register tag field with the new physical register identifier to associate the new physical register tag with the destination architectural register identifier.

FIG. 3 schematically illustrates a detailed example of the operation of the prediction circuitry 43 and the register rename circuitry 44. The prediction circuitry 43 and the register rename circuitry 44, as shown in FIG. 3, may be provided as part of the second rename stage 42 discussed previously with respect to FIG. 1. In the example shown the prediction circuitry 43 receives an input for specifying an instruction. This input can have different forms as discussed later with respect to FIG. 4. The prediction circuitry 43 is configured to predict a sector identifier in response to the input, and the sector identifier is provided to the register rename circuitry 44. The register rename circuitry 44 determines a destination physical register identifier corresponding to a destination physical register in a sector of the physical register file 22 identified by the sector identifier predicted by the prediction circuitry 43 to thereby map a destination architectural register identifier specified by the instruction to the destination physical register. The destination physical register is provided to the scheduling circuitry 45. In addition, in this example the prediction circuitry also predicts a delay indicator for controlling scheduling of one or more subsequent instructions, and the delay indicator is also provided to the scheduling circuitry 45. The scheduling circuitry 45 thus schedules timing of execution of the one or more subsequent instructions by the execution circuitry 12 accordingly and the result value generated for the instruction is written to the appropriate sector in the physical register file 22. As shown in FIG. 3, the destination physical register identifier determined by the register rename circuitry 44 is provided to update the physical register tag to physical register rename table 46 . . . . FIG. 4 schematically illustrates an example of the prediction circuitry 43 for predicting the sector identifier. As shown in FIG. 4, the prediction circuitry may optionally predict a delay indicator. The prediction of the delay indicator will be discussed later.

The prediction circuitry receives performance monitoring information which is indicative of performance achieved for a sequence of instructions when using different sector identifiers for at least one instruction. For example, a sequence of instructions may be executed and a time required for executing the sequence using different sector identifiers for a same instruction can be measured and provided as the performance monitoring information to the prediction circuitry. Using the performance monitoring information, prediction information indicating a sector which achieves advantageous performance results can be learned for the instruction.

For example, the performance monitoring information may indicate that changes in the sector identifier used for a given instruction result in changes in performance for the processing of the sequence of instructions. The performance monitoring information may be obtained by varying the sector identifier and determining (either through direct measurement or interpolation of measurements) which sector achieves the best performance. In some examples, the performance monitoring information may be obtained for the instruction by using each possible sector of the register file 22 to determine which sector achieves the best measured performance.

For example, the performance monitoring information may be obtained using a first sector having favourable access properties (e.g. low access latency) and also obtained using a second sector having less favourable access properties (e.g. higher access latency). If no change in performance is observed between using the first sector and the second sector, then this can indicate that changing the sector identifier for the instruction does not influence performance for the sequence of instructions. Consequently, the prediction circuitry may learn to update the prediction information for that instruction to indicate a sector identifier corresponding to a sector of the register file 22 having less favourable access properties (e.g. higher access latency). In particular, the prediction circuitry may learn to generate prediction information so that a sector identifier corresponding to a sector with a lowest access performance is predicted for this instruction since there is no cost to performance for this. This can potentially free up other sectors for use by other instructions for which changes in the sector identifier do contribute to improved performance. If a change in performance is observed between using the first sector and the second sector, this can indicate that performance benefits can be achieved by selecting an appropriate sector identifier. The prediction circuitry may thus learn to generate prediction information for that instruction which indicates a sector identifier corresponding to a sector of the register file 22 having more favourable access properties (e.g. lower access latency).

However, for some cases it may be that improvement in performance is achieved when using a first sector instead of a second sector (the first sector having more favourable access characteristics than the second sector), but that no improvement (or substantially no improvement) in performance is achieved when using another sector instead of the first sector (the another sector having more favourable access characteristics than the first sector). This example refers to using three sector identifiers and establishing that the instruction (specifically changing the sector identifier for the instruction) has an influence on performance but that above a certain access performance for a sector then no further performance benefit is achieved. It will be appreciated that more than three sector identifiers may be used to establish this relationship and an optimal sector identifier may be learned for the instruction that achieves optimal performance whilst allowing higher access performance sectors to be reserved for other instructions which may benefit from use of those sectors.

The prediction information can be learned from the performance monitoring information by using various learning techniques, such as reinforcement learning. Hence, in some examples the prediction circuitry may comprise a reinforcement learning engine for updating the prediction information responsive to the performance monitoring information and learning may be performed as part of an online process. Through the use of different sector identifiers for a given instruction, and with increasing numbers of sector identifiers, the prediction information can be learned so as to select the sector identifier that corresponds to optimal performance for the processing of the sequence of instructions.

FIG. 5A schematically illustrates an example of the prediction information learned using the performance monitoring information. FIG. 5A illustrates an example of the prediction information for a single instruction, however, the same principles can be applied for multiple instructions and the table shown may include any number of rows for storing the prediction information for any suitable number of instructions. In FIG. 5A, the left column includes an entry that stores a value of a program counter (PC) for an instruction. The middle column includes an entry that stores a sector identifier (sector ID) that has been learned for the instruction. The right column includes an entry that stores a confidence value associated with the sector identifier that has been learned. The confidence value provides an indication of a degree of confidence for the sector identifier that has been learned and may take any suitable form, such as a binary integer (e.g. value ranging between 0 and $2^N-1$, where N is the number of bits of the confidence indication).

The prediction circuitry can receive an input as shown on the left hand side of FIG. 4 and, using the prediction information shown in FIG. 5A, a sector identifier can be predicted.

In some cases, the input to the prediction circuitry may comprise only a value of a program counter associated with an instruction for which a destination architectural register identifier is to be renamed. In this case, using the prediction information shown in FIG. 5A, the entry that stores the value of the program counter can thus be looked-up and the associated sector identifier selected.

In some cases, the input to the prediction circuitry may comprise a subset of the bits of the program counter associated with an instruction and the architectural register identifier specified by the instruction. This is schematically shown in FIG. 4. In this case, the prediction information as schematically shown in FIG. 5B may be used for predicting the sector identifier for the instruction specified by the input.

Referring to FIG. 5B, in some examples the prediction information may further comprise an entry that stores a destination architectural register identifier specified by an instruction. The entry that stores a value of a program counter for an instruction can be the same as that discussed with respect to FIG. 4 so that each bit of the program counter is stored. However, this can be expensive in hardware and power considerations. Circuit area and energy saving improvements are thus achieved by, as shown schematically in FIG. 5B, the entry in the PC field storing a subset of the bits of the program counter.

Therefore, rather than requiring the full value of the program counter (e.g. 32 or 64 bits in a 32 or 64-bit architecture) to be provided as an input to the prediction circuitry, a subset of the bits of the program counter as well as the architectural register identifier can be input to the prediction circuitry to achieve circuit area and power saving improvements. In this case, entries in the prediction information matching the architectural register identifier and also the portion of the program counter can be determined. Any suitable technique may be used for matching the input to a row included in the prediction information schematically shown in FIG. 5B. The corresponding PC subset and destination architectural register identifier in the prediction information can thus be looked-up and the associated sector identifier selected for the instruction. Hence more generally, a look-up with respect to the prediction information can be performed based on the input comprising the PC subset and destination architectural register identifier, and the associated sector identifier can be selected for use in deciding a physical register to be allocated for the destination architectural register identifier specified by an instruction.

The above techniques refer to the prediction circuitry predicting the sector identifier so that a result value generated for an instruction can be stored in an appropriate sector of the physical register file 22. However, as explained with reference to FIGS. 3 and 4, the prediction circuitry is also operable to predict a delay indicator for an instruction. Therefore, in addition to predicting the sector of the register file to be used for storing the result value, a delay indicator can also be predicted for controlling scheduling of one or more instructions after the instruction.

The delay indicator may control scheduling of one or more subsequent instructions either by indicating a result availability delay for the result value so that other instructions depending on the result value are thereby delayed, or by directly delaying one or more subsequent instructions. The delay indicator can thus provide controlled delay of one or more instructions that depend on the result value of the given instruction. For example, the delay indicator may specify a number of cycles for which either availability of a result value is suppressed or for which one or more subsequent instructions cannot be executed. In some cases, it has been observed that whilst source operands specified by some instructions may be available, functional units in the execution circuitry for performing the specified data processing operations may not be available and instructions can become stalled. Therefore, in some cases delaying one or more instructions using the delay indicator to provide a controlled amount of delay can provide performance benefits.

FIG. 5C schematically illustrates another example of the prediction information that can be learned using the performance monitoring information. Like FIGS. 5A and 5B, FIG. 5C also illustrates an example of the prediction information for a single instruction, however, the same principles can be applied for multiple instructions and the table shown may include any number of rows for storing the prediction information for any suitable number of instructions. As shown in FIG. 5C, the prediction information includes entries for storing a value of a program counter associated with an instruction, a sector identifier and a confidence value. In addition, the prediction information includes an entry for storing a delay indicator for an instruction. In the example shown in FIG. 5C, the entry storing the confidence value may store confidence values for each of the sector identifier and the delay indicator, or may store a combined confidence score for the combination of the sector identifier and the delay indicator.

Therefore, the prediction circuitry can receive an input comprising at least some of a value of a program counter associated with an instruction and the prediction circuitry can predict both a sector identifier and a delay indicator for the instruction according to the prediction information of FIG. 5C.

In some cases, the prediction circuitry can receive an input comprising a subset of a value of a program counter associated with an instruction and an architectural register identifier specified by the instruction, and the prediction circuitry can predict both a sector identifier and a delay indicator for the instruction according to the prediction information of FIG. 5D. The example prediction information of FIG. 5D includes an entry for storing a subset of a value of a program counter for an instruction and also an entry for storing an architectural register identifier specified by an instruction in a manner similar to what has been discussed for FIG. 5B. Therefore, a total number of bits provided as an input to the prediction circuitry can be reduced comparative to inputting the full program counter value. Entries in the prediction information matching the input architectural register identifier and also the portion of the program counter can be looked-up, and the corresponding sector identifier entry and delay indicator entry selected.

The sector identifier and the delay indicator for a given instruction can both be learned using performance monitoring information indicative of performance when executing a sequence of instructions using different sector identifiers and different delay indicators for the given instruction. By changing the sector identifier and the delay indicator and monitoring changes in performance (including whether there is even a change in performance), a value of the sector identifier and the delay indicator associated with favourable performance can be learned. Hence, prediction information can be learned for the given instruction in dependence on the performance monitoring information for selecting a sector identifier and a delay indicator for the given instruction.

In some cases, source operands specified by some instructions may be available in the physical register file 22, however, functional units in the execution circuitry 12 for performing the specified data processing operations may not be available and instructions can become stalled. For example, instructions can become stalled at the issue stage 10 or register read stage 11. The inventor has identified that in some cases delaying one or more instructions using the delay indicator can provide performance benefits. By delaying an instruction which is unlikely to give a performance benefit if completed sooner (e.g. as its dependent instructions may get stalled anyway), this may free up resources that can be better used for another instruction that is not as likely to cause a stall. Using the delay indicator, controlled scheduling of one or more subsequent instructions that depend on the given instruction can be performed and an amount of delay for achieving enhanced performance can be learned through the performance monitoring information.

Therefore, FIGS. 5A-D provide examples of the prediction information that may be learned in dependence on the performance monitoring information obtained using different sector identifiers and optionally also different delay indicators for instructions when executing an instruction sequence. The prediction circuitry is thus operable to receive an input specifying an instruction (e.g. by specifying an instruction with using a subset of PC and architectural register identifier) and, responsive to that input, predict a sector identifier and delay indicator that has been learned for that instruction.

As mentioned previously, there are a number of possible learning techniques for learning the prediction information using the performance monitoring information. The prediction information may be learned in advance as part of an offline learning process or may be learned as part of an online process. Therefore, in the example shown in FIG. 1, the second rename stage 42 may access prediction information that has been learned in advance for one or more instructions such that the prediction information is fixed.

For example, the prediction information may be learned in advance by collecting performance monitoring information and using the performance monitoring information as training data to train a machine learning model or reinforcement learning algorithm to learn an action (in this case, either a sector identifier or both a sector identifier and a delay indicator) for a given instruction that correlates with an observation state associated with favourable performance.

Alternatively, the second rename stage 42 (specifically the prediction circuitry) may comprise a learning engine for learning the prediction information and updating the prediction information responsive to the performance of the instructions executed in accordance with the sector identifier (or sector identifiers and delay indicators) predicted by the prediction circuitry. The prediction circuitry may comprise a learning engine that uses reinforcement learning techniques for learning the prediction information. For example, a reinforcement learning engine may be provided which takes an action (that is selects a sector identifier) for a given instruction, receives an observation of a state that results from that action (that is performance information indicating performance achieved when using the sector identifier) and updates the prediction information responsive to the observation. The reinforcement learning engine may use a reward function such that actions receive a positive reward or a negative reward according to the influence on the observation state. In this way, the reinforcement learning engine can learn to update the prediction information to predict sector identifiers with desirable performance outcomes. The prediction information can thus be learned in an iterative manner according to the performance monitoring information received responsive to the predictions made by the prediction circuitry using the prediction information.

FIG. 6 schematically illustrates a method of updating the prediction information. At a step 610, the prediction circuitry receives performance monitoring information indicative of performance achieved for a sequence of instructions when using a given sector identifier predicted by the prediction circuitry for a given instruction. At a step 620, the prediction circuitry updates the prediction information associated with the given instruction in dependence upon the performance monitoring information. In some examples, updating the prediction information associated with a respective instruction may comprise updating a sector identifier to indicate a different sector identifier and/or updating a confidence value to indicate an increase or a decreased confidence. The method of FIG. 6 may similarly be applied for updating the prediction information with respect to the delay indicator.

FIG. 7 schematically illustrates a method of selecting a sector identifier for an instruction. At a step 710, the prediction circuitry receives an input associated with a given instruction. As discussed above the input may specify a value of a program counter for an instruction or instead specify a subset of the bits of the program counter and a destination architectural register identifier. At a step 720, the prediction circuitry selects an entry of the prediction information based on the input. This may be performed by matching the input to a row in the prediction information, in which each row includes information for a respective instruction. In particular, matching of the input to the PC entry or the entries including the subset of the PC and the architectural register identifier may be performed. At a step 730, the prediction circuitry selects the sector identifier associated with the entry.

FIG. 8 schematically illustrates a method of selecting a sector identifier and a delay indicator for an instruction. At a step 810, the prediction circuitry receives an input associated with a given instruction. The input is the same as that discussed with respect to FIG. 7. At a step 820, the prediction circuitry selects an entry of the prediction information based on the input. This step is the same as the step 720 in FIG. 7. At a step 830, the prediction circuitry selects the sector identifier associated and the delay indicator associated with the entry.

FIG. 9 schematically illustrates a method of capturing performance monitoring information for a sequence of instructions using demarcating instructions. The demarcating instructions can be provided for a sequence of instructions to bound the sequence or a subset of the instructions in the sequence and execution of the demarcating instructions can be used for starting and stopping capture of performance monitoring information. In particular, timing measurements for executing the sequence (or a subset of the sequence) can be obtained by measuring elapsed times between execution of the demarcating instructions. As shown in FIG. 9, at a step 910, a first demarcating instruction is executed. At a step 920, capturing of performance monitoring information is started in response to the execution of the first demarcating instruction. At a step 930, a second demarcating instruction is executed. At a step 940, capturing of performance monitoring information is stopped in response to the execution of the first demarcating instruction. The demarcating instructions may in some examples be provided to bound a sequence of instructions corresponding to an iterative code block and/or may be provided at a start and an end of each iteration. Hence, the demarcating instructions can be executed to allow measurement of an amount of time required to process each iteration and/or an amount of time required to process a given number of iterations.

FIG. 10 schematically illustrates a method for capturing performance monitoring information using different settings for different subsets of iterations of an iterative code block. At a step 1010, a sector identifier (shown as sector ID in FIG. 10) and a delay indicator are set (specified) as a first setting to be used for a given instruction. At a step 1020, first performance monitoring information is captured for a subset of iterations of an iterative code block. In particular, the performance monitoring information may be captured at the step 1020 using execution of demarcating instructions as discussed with respect to FIG. 9. At a step 1030, a sector identifier and a delay indicator are set (specified) as another setting to be used for the given instruction, in which the another setting differs from the first setting because at least one of the sector identifier and the delay indicator is changed. In particular, in some examples both the sector identifier and the delay indicator are changed for use in the second subset of iterations. At a step 1040, second performance monitoring information is captured for a second subset of iterations of the iterative code block, again this may be achieved using demarcating instructions. At a step 1050, a comparison of first performance monitoring information and the second performance monitoring information is used to perform an update to the prediction information. In particular, the step 1050 may be performed using a reinforcement learning engine that receives the first and second performance monitoring information and updates existing prediction information.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

CLAUSES

Clause 1. A data processing apparatus comprising:
    a physical register array comprising a plurality of sectors having one or more different access properties, each sector of the plurality of sectors comprising at least one physical register;
    prediction circuitry to predict, for a given instruction, a sector identifier identifying one of the sectors of the physical register array to be used for a destination register of the given instruction, wherein the prediction circuitry is configured to select the sector identifier in dependence on prediction information learnt from performance monitoring information indicative of performance achieved for a sequence of instructions when using different sector identifiers for the given instruction;
    register rename circuitry to map a destination architectural register identifier specified by the given instruction to a destination physical register in the sector identified by the sector identifier predicted by the prediction circuitry; and
    execution circuitry to execute the given instruction and generate a result to be written to the destination physical register mapped to the destination architectural register identifier by the register rename circuitry.

Clause 2. The data processing apparatus according to clause 1, wherein the prediction circuitry is configured to receive an input comprising at least a portion of a value of a program counter associated with the given instruction and to predict the sector identifier for the given instruction in dependence on the input and the prediction information.

Clause 3. The data processing apparatus according to clause 2, wherein the input received by the prediction circuitry comprises the destination architectural register identifier specified by the given instruction.

Clause 4. The data processing apparatus according to any preceding clause, wherein the performance monitoring information comprises timing information indicative of measured times to process the sequence of instructions using different sector identifiers for the given instruction, and wherein the prediction circuitry is configured to predict, as the sector identifier for the given instruction, a sector identifier learned for the given instruction in dependence on the measured times.

Clause 5. The data processing apparatus according to clause 4, wherein the prediction circuitry is configured to learn, as the sector identifier learned for the given instruction in dependence on the measured times, a sector identifier that corresponds to a shortest time to process the given sequence of instructions.

Clause 6. The data processing apparatus according to clause 4 or clause 5, wherein for one or more other instructions associated with the sequence of instructions, the performance monitoring information comprises timing information indicative of measured times to process the sequence of instructions using different sector identifiers for each of the one or more other instructions, and wherein the prediction circuitry is configured to predict, as a respective sector identifier for each of the one or more other instructions, a respective sector identifier learned for each of the one or more other instructions in dependence on the measured times.

Clause 7. The data processing apparatus according to any one of clauses 1 to 3, wherein the performance monitoring information comprises timing information indicative of measured times to process the sequence of instructions using different sector identifiers for the given instruction and different delay indicators for controlling scheduling of one or more subsequent instructions after the given instruction, and wherein the prediction circuitry is configured to predict, as the sector identifier and a delay indicator for the given instruction, a sector identifier and a delay indicator learned for the given instruction in dependence on the measured times.

Clause 8. The data processing apparatus according to clause 7, wherein the prediction circuitry is configured to learn, as the sector identifier and the delay indicator learned for the given instruction in dependence on the measured times, a combination of a sector identifier and a delay indicator that corresponds to a shortest time to process the given sequence of instructions.

Clause 9. The data processing apparatus according to clause 7 or clause 8, wherein for one or more other instructions associated with the sequence of instructions, the performance monitoring information comprises timing information indicative of measured times to process the sequence of instructions using different sector identifiers and different delay indicators for each of the one or more other instructions, and wherein the prediction circuitry is configured to predict, as a respective sector identifier and respective delay indicator for each of the one or more other instructions, a respective sector identifier and a respective delay indicator learned for each of the one or more other instructions in dependence on the measured times.

Clause 10. The data processing apparatus according to any one of clauses 7 to 9, comprising scheduling circuitry to schedule timing of execution of one or more of the subsequent instructions based on the delay indicator predicted for the given instruction by the prediction circuitry.

Clause 11. The data processing apparatus according to clause 10, wherein the delay indicator is indicative of at least one of a result availability delay for a result of the given instruction and a subsequent instruction execution delay, and the scheduling circuitry is configured to delay execution of one or more of the subsequent instructions based on the delay indicator.

Clause 12. The data processing apparatus according to any preceding clause, wherein in response to execution of the sequence of instructions, the prediction circuitry is configured to obtain, for the performance monitoring information, a measurement of a time to process a given number of iterations of the sequence of instructions and to update the prediction information in dependence upon the time to process the given number of iterations.

Clause 13. The data processing apparatus according to any one of clauses 1 to 11, wherein the prediction circuitry is configured to obtain, for the performance monitoring information, at least a first measurement of a time to process a subset of the given number of iterations using a first sector identifier for the given instruction, and a second measurement of a time to process another subset of the given number of iterations using a second sector identifier for the given instruction, wherein the first and second sector identifiers identify different sectors of the physical register.

Clause 14. The data processing apparatus according to any preceding clause, wherein in response to execution of demarcating instructions bounding the sequence of instructions, the prediction circuitry is configured to obtain the performance monitoring information indicative of performance achieved for the sequence of instructions occurring between the demarcating instructions.

Clause 15. The data processing apparatus according to any preceding clause, wherein the one or more different access properties comprise one or more of: a different access latency and a different number of read ports.

Clause 16. The data processing apparatus according to any preceding clause, wherein the register rename circuitry is configured to map one or more architectural register identifiers specified by the given instruction to one or more physical register tags as a first stage of register renaming for the instruction, and to map the one or more physical register tags to one or more physical registers of the physical register array as a second stage of register renaming, the first stage being earlier in a processing pipeline than the second stage.

Clause 17. The data processing apparatus according to clause 16, wherein the register rename circuitry is configured to map a source architectural register identifier specified by the given instruction to a source physical register tag based on a mapping table comprising entries mapping respective architectural register identifiers to respective physical register tags, each physical register tag capable of being mapped by the second stage of register renaming to any of a plurality of physical register identifiers.

Clause 18. A non-transitory computer-readable medium to store computer-readable code for fabrication of the data processing apparatus according to any preceding clause.

Clause 19. A data processing method comprising:
predicting, for a given instruction, a sector identifier identifying a sector of a physical register array to be used for a destination register of the given instruction, the physical register array comprising a plurality of sectors having one or more different access properties, each sector of the plurality of sectors comprising at least one physical register, wherein predicting the sector identifier for the given instructions comprises selecting the sector identifier in dependence on prediction information learnt from performance monitoring information indicative of performance achieved for a sequence of instructions when using different sector identifiers for the given instruction;
mapping a destination architectural register identifier specified by the given instruction to a destination physical register in the sector identified by the sector identifier predicted for the given instruction; and
executing the given instruction and generating a result to be written to the destination physical register mapped to the destination architectural register identifier.

Clause 20. A data processing apparatus comprising:
a physical register array comprising a plurality of sectors having one or more different access properties, each sector of the plurality of sectors comprising at least one physical register;
prediction circuitry to predict, for a given instruction, a sector identifier identifying one of the sectors of the physical register array to be used for a destination register of the given instruction and a delay indicator for controlling scheduling of one or more subsequent instructions after the given instruction, wherein the prediction circuitry is configured to predict the sector identifier and the delay indicator in dependence on prediction information learnt from performance monitoring information indicative of performance achieved for a sequence of instructions when using different sector identifiers and different delay indicators for the given instruction;

register rename circuitry to map a destination architectural register identifier specified by the given instruction to a destination physical register in the sector identified by the sector identifier predicted by the prediction circuitry;

execution circuitry to execute the given instruction and generate a result to be written to the destination physical register mapped to the destination architectural register identifier by the register rename circuitry; and scheduling circuitry to schedule timing of execution of one or more of the subsequent instructions based on the delay indicator predicted by the prediction circuitry.

The invention claimed is:

1. A data processing apparatus comprising:
a physical register array comprising a plurality of sectors, each of the plurality of sectors having one or more different access properties compared to other sectors of the plurality of sectors, each sector of the plurality of sectors comprising at least one physical register;
prediction circuitry to predict, for a given instruction, a sector identifier identifying one of the sectors of the physical register array to be used for a destination register of the given instruction, wherein the prediction circuitry is configured to select the sector identifier in dependence on prediction information learnt from performance monitoring information indicative of performance achieved for a sequence of instructions when using different sector identifiers for the given instruction;
register rename circuitry to map a destination architectural register identifier specified by the given instruction to a destination physical register in the sector identified by the sector identifier predicted by the prediction circuitry; and
hardware execution circuitry to execute the given instruction and generate a result to be written to the destination physical register mapped to the destination architectural register identifier by the register rename circuitry.

2. The data processing apparatus according to claim 1, wherein the prediction circuitry is configured to receive an input comprising at least a portion of a value of a program counter associated with the given instruction and to predict the sector identifier for the given instruction in dependence on the input and the prediction information.

3. The data processing apparatus according to claim 2, wherein the input received by the prediction circuitry comprises the destination architectural register identifier specified by the given instruction.

4. The data processing apparatus according to claim 1, wherein the performance monitoring information comprises timing information indicative of measured times to process the sequence of instructions using different sector identifiers for the given instruction, and wherein the prediction circuitry is configured to predict, as the sector identifier for the given instruction, a sector identifier learned for the given instruction in dependence on the measured times.

5. The data processing apparatus according to claim 4, wherein the prediction circuitry is configured to learn, as the sector identifier learned for the given instruction in dependence on the measured times, a sector identifier that corresponds to a shortest time to process the sequence of instructions.

6. The data processing apparatus according to claim 4, wherein for one or more other instructions associated with the sequence of instructions, the performance monitoring information comprises timing information indicative of other measured times to process the sequence of instructions using different sector identifiers for each of the one or more other instructions, and wherein the prediction circuitry is configured to predict, as a respective sector identifier for each of the one or more other instructions, a respective sector identifier learned for each of the one or more other instructions in dependence on the other measured times.

7. The data processing apparatus according to claim 1, wherein the performance monitoring information comprises timing information indicative of measured times to process the sequence of instructions using different sector identifiers for the given instruction and different delay indicators for controlling scheduling of one or more subsequent instructions after the given instruction, and wherein the prediction circuitry is configured to predict, as the sector identifier and a delay indicator for the given instruction, a sector identifier and a delay indicator learned for the given instruction in dependence on the measured times.

8. The data processing apparatus according to claim 7, wherein the prediction circuitry is configured to learn, as the sector identifier and the delay indicator learned for the given instruction in dependence on the measured times, a combination of a sector identifier and a delay indicator that corresponds to a shortest time to process the sequence of instructions.

9. The data processing apparatus according to claim 7, wherein for one or more other instructions associated with the sequence of instructions, the performance monitoring information comprises timing information indicative of other measured times to process the sequence of instructions using different sector identifiers and different delay indicators for each of the one or more other instructions, and wherein the prediction circuitry is configured to predict, as a respective sector identifier and respective delay indicator for each of the one or more other instructions, a respective sector identifier and a respective delay indicator learned for each of the one or more other instructions in dependence on the other measured times.

10. The data processing apparatus according to claim 7, comprising scheduling circuitry to schedule timing of execution of one or more of the subsequent instructions based on the delay indicator predicted for the given instruction by the prediction circuitry.

11. The data processing apparatus according to claim 10, wherein the delay indicator is indicative of at least one of a result availability delay for a result of the given instruction and a subsequent instruction execution delay, and the scheduling circuitry is configured to delay execution of one or more of the subsequent instructions based on the delay indicator.

12. The data processing apparatus according to claim 1, wherein in response to execution of the sequence of instructions, the prediction circuitry is configured to obtain, for the performance monitoring information, a measurement of a time to process a given number of iterations of the sequence of instructions and to update the prediction information in dependence upon the time to process the given number of iterations.

13. The data processing apparatus according to claim 1, wherein the prediction circuitry is configured to obtain, for the performance monitoring information, at least a first measurement of a time to process a subset of a given number of iterations of the sequence of instructions using a first sector identifier for the given instruction, and a second measurement of a time to process another subset of the given number of iterations using a second sector identifier for the given instruction, wherein the first and second sector identifiers identify different sectors of the physical register array.

14. The data processing apparatus according to claim 1, wherein in response to execution of demarcating instructions bounding the sequence of instructions, the prediction circuitry is configured to obtain the performance monitoring information indicative of performance achieved for the sequence of instructions occurring between the demarcating instructions.

15. The data processing apparatus according to claim 1, wherein the one or more different access properties comprise one or more of: a different access latency and a different number of read ports.

16. The data processing apparatus according to claim 1, wherein the register rename circuitry is configured to map one or more architectural register identifiers specified by the given instruction to one or more physical register tags as a first stage of register renaming for the given instruction, and to map the one or more physical register tags to one or more physical registers of the physical register array as a second stage of register renaming, the first stage being earlier in a processing pipeline than the second stage.

17. The data processing apparatus according to claim 16, wherein the register rename circuitry is configured to map a source architectural register identifier specified by the given instruction to a source physical register tag based on a mapping table comprising entries mapping respective architectural register identifiers to respective physical register tags, each physical register tag capable of being mapped by the second stage of register renaming to any of a plurality of physical register identifiers.

18. A non-transitory computer-readable medium to store computer-readable code for fabrication of the data processing apparatus according to claim 1.

19. A data processing method comprising:
predicting, for a given instruction, a sector identifier identifying a sector of a physical register array to be used for a destination register of the given instruction, the physical register array comprising a plurality of sectors, each of the plurality of sectors having one or more different access properties compared to other sectors of the plurality of sectors, each sector of the plurality of sectors comprising at least one physical register, wherein predicting the sector identifier for the given instructions comprises selecting the sector identifier in dependence on prediction information learnt from performance monitoring information indicative of performance achieved for a sequence of instructions when using different sector identifiers for the given instruction;
mapping a destination architectural register identifier specified by the given instruction to a destination physical register in the sector identified by the sector identifier predicted for the given instruction; and
executing the given instruction and generating a result to be written to the destination physical register mapped to the destination architectural register identifier.

20. A data processing apparatus comprising:
a physical register array comprising a plurality of sectors, each of the plurality of sectors having one or more different access properties compared to other sectors of the plurality of sectors, each sector of the plurality of sectors comprising at least one physical register;
prediction circuitry to predict, for a given instruction, a sector identifier identifying one of the sectors of the physical register array to be used for a destination register of the given instruction and a delay indicator for controlling scheduling of one or more subsequent instructions after the given instruction, wherein the prediction circuitry is configured to predict the sector identifier and the delay indicator in dependence on prediction information learnt from performance monitoring information indicative of performance achieved for a sequence of instructions when using different sector identifiers and different delay indicators for the given instruction;
register rename circuitry to map a destination architectural register identifier specified by the given instruction to a destination physical register in the sector identified by the sector identifier predicted by the prediction circuitry;
hardware execution circuitry to execute the given instruction and generate a result to be written to the destination physical register mapped to the destination architectural register identifier by the register rename circuitry; and
scheduling circuitry to schedule timing of execution of one or more of the subsequent instructions based on the delay indicator predicted by the prediction circuitry.

* * * * *